(No Model.)
G. W. LANDON.
MOLDING MACHINE.
No. 249,246. Patented Nov. 8, 1881.
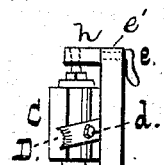
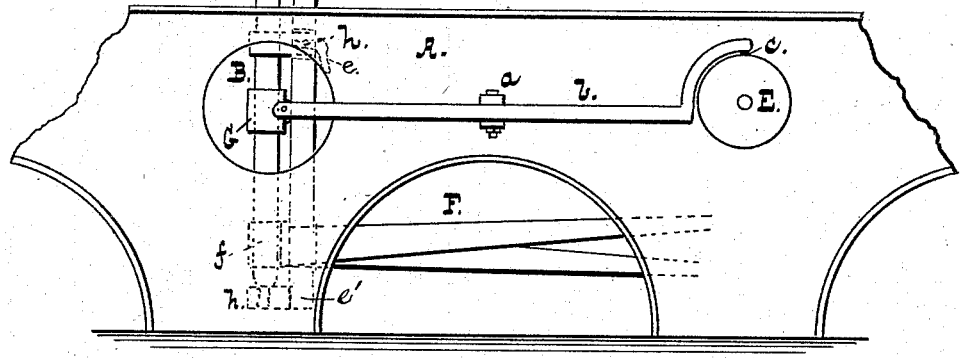
Fig. 1.
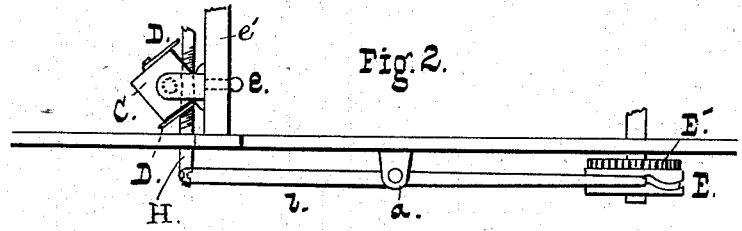
Fig. 2.
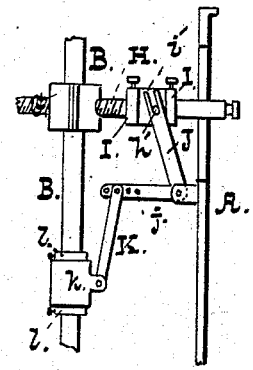
Fig. 3.
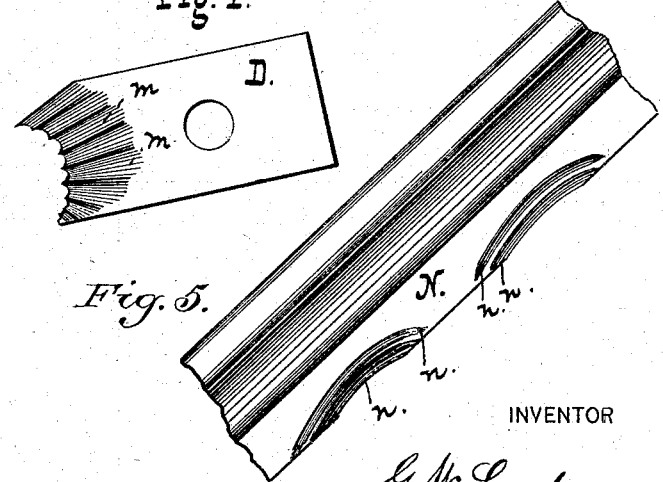
Fig. 4.
Fig. 5.
WITNESSES.
W. A. Betham
D. H. Barclay.
INVENTOR
G. W. Landon.
BY
N. W. Williams.
ATTORNEY.
N. PETERS, Photo-Lithographer, Washington, D. C.

United States Patent Office.

GEORGE W. LANDON, OF BALTIMORE, MARYLAND, ASSIGNOR OF ONE-HALF TO HARRISON C. MOORE, OF SAME PLACE, AND CHARLES G. HILL, OF ARLINGTON, MARYLAND.

MOLDING-MACHINE.

SPECIFICATION forming part of Letters Patent No. 249,246, dated November 8, 1881.

Application filed April 5, 1881. (No model.)

*To all whom it may concern:*

Be it known that I, GEORGE W. LANDON, of Baltimore city, State of Maryland, have invented certain new and useful Improvements in Molding-Machines; and I hereby declare the same to be fully, clearly, and exactly described as follows, reference being had to the accompanying drawings, in which—

Figure 1 is a side elevation of the part of an ordinary molding-machine to which my invention relates. Fig. 2 is a top plan of the same; Fig. 3, a side elevation of the attachment for reciprocating the cutter vertically. Fig. 4 is a side elevation of the cutter, and Fig. 5 is a plan of the molding which the machine is designed to make.

The object of my invention is to provide an attachment for molding-machines of the well-known standard patterns, whereby varieties of moldings can be made which have heretofore only been produced by the tedious and expensive method of carving by hand.

The principal form of fancy molding in general use is what is termed "shell-molding." The design is produced by forming in the outer bead of the molding, at regular intervals, a series of concavities having parallel beads similar to those on the convex surface of a mussel-shell, and hence the term used to designate the molding. These concavities have heretofore been made by hand-chiseling at a cost of about a half a cent per foot of molding. I produce them in the operation of cutting the molding itself by means of a simple attachment to the machine.

In the drawings, A is the frame of the well-known Lee molder, and B is the shaft, carrying a cutter-head, C, and cutter D. On the side of the machine are bolted lugs $a$, between which is pivoted a lever, $b$, carrying at one end a pin, $c$, and attached at the other to a rod, H, which is connected with a sleeve, G, on the shaft B. The rod H is threaded at the portion which passes through the sleeve G for the purpose of adjusting the shaft B laterally. E' is a gear-wheel on the same shaft, meshing with a similar wheel driven by the prime motor of the machine. The shaft B is mounted in three bearings, $h\ h\ h$, which are susceptible of a lateral sliding motion, carrying the shaft B and cutter-head to one side. Clamp-handles $e$ serve to secure the bearings when desired. The shanks of the clamp-handles pass through slots in the bars, in which slots they slide freely with the lateral motion of the shaft B. A pulley, $f$, near the lower end of the shaft, is driven by a belt, F, as shown.

In operation the cutters D are secured by bolts $d$ at the proper angle in the cutter-head, C, and the machine being set in motion the wood is fed in, as usual, at the end. The ordinary beads are formed on the molding before it encounters the cutters D. It will be understood that a horizontal reciprocating motion is imparted to the cutter-head C by means of the shaft H, lever $b$, and cam race on the disk E, whereby the cutters are caused to approach and recede from the molding, and form in its edge a series of concavities, regulated as to depth and intervals, respectively, by the throw of the lever and the relative speeds of the feed mechanism and the disk E. These factors may obviously be readily adjusted, so that the cut is determined in the particulars named. As to the face design of the cut, that, of course, depends upon the contour of the edge of the cutters D. In making shell-molding the end of the blade is hollowed, (see Fig. 4,) and toward the concavity run a series of grooves or channels, $m$, being pitched at an angle to the blade. The sections of the rear face of the latter made by these circular grooves are elliptical, and hence the resulting cut formed by a revolution of the cutter-head is circular in cross-section, elliptical in longitudinal section, and has elliptical beads. The effect is that of the surface of a shell, the molding N having the cuts $n\ n$, as shown. In this case these cuts are horizontal. When it is desired to incline them I make use of the attachment shown in Fig. 3, the design of which is to impart to the cutter-head, in addition to the horizontal motion, a vertical reciprocation.

On the shaft B is mounted a loose sleeve, $k$, between collars $l\ l$, that are vertically adjustable on the shaft, and are secured by set-screws, as shown. To the sleeve $k$ is attached a rod, K, adjustably connected by means of a pin and holes, $j$, to one end of a bell-crank lever, J, pivoted to the frame A. The other end of the lever is slotted and embraces a pin, $h'$, on a collar, $i'$, adjustably mounted between collars I on the shaft H.

It will be apparent that the throw of the shaft H will cause the shaft B to rise and fall. The extent of this motion is determined by the distance of the end of the rod K from the fulcrum of the lever J, and the relation of the rise and fall to the other motion of the cutter is determined by the position of the collar $i$ on the shaft H.

From the foregoing it will be seen that the shaft B, while turning at any desired speed, may have imparted to it a rise and fall and a lateral reciprocating motion, each independently adjustable, whence it follows that, suitable knives being used, an endless variety of cut may be made. A very pleasing design, which is readily producible, may be mentioned—namely, that of a series of inclined grooves running partly around the face of the outer head. The effect is that of a rope or cord wrapped around the bead.

The device is attached to the molder at a cost that is offset by the first day's work.

No end of beautiful designs can be made by means of a few knives and cam-disks, E. Three knives and three disks, for instance, will make eighteen different designs of molding, invoking the aid of the mechanism shown in Fig. 3, without even altering adjustments, and these latter being infinite the variety is likewise.

What I claim is—

1. In combination with the disk E, having a cam-race on its periphery and mounted on the driving-shaft of the molder, the lever $b$, pivoted at the side of the machine, and connected with the cutter-shaft B by means of the rod H and sleeve G, as set forth.

2. In combination with the revolving shaft and cutter-head, the arm K, attached to the bent lever J, whose opposite end is connected with the mechanism for reciprocating the revolving shaft laterally, as set forth.

3. In combination with the revolving shaft and cutter-head, the arm K, adjustably connected with the bent lever J, the opposite end of which engages with a collar adjustably mounted on the shaft H, which latter effects the lateral movement of the cutter-head, as and for the purpose set forth.

4. In combination with the cam-disk E, lever $b$, and shaft H, connected with the cutter-shaft B, as described, the bent lever J, connected with the shafts B and H, whereby the cutter-head is given a lateral and a vertical reciprocating movement, as set forth.

5. In combination with the revolving shaft and cutter-head, the arm K and lever J, having slot which embraces the pin $h'$, adjustably secured to the shaft H, the lever $b$, and cam-disk E, whereby the vertical motion of the cutter-head is regulated both as to its extent and as to the period of its occurrence with reference to the lateral motion of the same, as set forth.

GEO. W. LANDON.

Witnesses:
R. D. WILLIAMS,
J. C. GITTINGER.